(12) United States Patent
Bravi et al.

(10) Patent No.: US 11,639,857 B2
(45) Date of Patent: May 2, 2023

(54) OBJECTIVE GENERATION OF A POINT OF INTEREST SCORE BASED ON QUANTITIES OF USER STOPS

(71) Applicant: Verizon Connect Development Limited, Sandyford (IE)

(72) Inventors: Luca Bravi, Scandicci (IT); Stefano Caprasecca, Florence (IT); Matteo Simoncini, Pistoia (IT); Leonardo Sarti, Sesto Fiorentino (IT)

(73) Assignee: Verizon Connect Development Limited, Dublin (IE)

( * ) Notice: Subject to any disclaimer, the term of this patent is extended or adjusted under 35 U.S.C. 154(b) by 198 days.

(21) Appl. No.: 17/166,403

(22) Filed: Feb. 3, 2021

(65) Prior Publication Data

US 2021/0231456 A1    Jul. 29, 2021

Related U.S. Application Data

(63) Continuation of application No. 16/356,956, filed on Mar. 18, 2019, now Pat. No. 10,921,151.

(51) Int. Cl.
| | |
|---|---|
| *G01C 21/36* | (2006.01) |
| *G01S 19/42* | (2010.01) |
| *G01C 21/28* | (2006.01) |

(52) U.S. Cl.
CPC ......... *G01C 21/3679* (2013.01); *G01C 21/28* (2013.01); *G01S 19/42* (2013.01)

(58) Field of Classification Search
CPC ..... G01C 21/28; G01C 21/3679; G01S 19/14; G01S 19/42; H04W 4/021
See application file for complete search history.

(56) References Cited

U.S. PATENT DOCUMENTS

| | | | |
|---|---|---|---|
| 10,228,258 B2 | 3/2019 | Mach et al. | |
| 10,921,151 B2* | 2/2021 | Bravi | G01C 21/3679 |
| 2014/0372022 A1 | 12/2014 | Witmer | |
| 2015/0204688 A1 | 7/2015 | Gearhart et al. | |
| 2016/0161274 A1 | 6/2016 | Mach et al. | |
| 2019/0154457 A1 | 5/2019 | Mach et al. | |
| 2019/0156680 A1 | 5/2019 | Sarti et al. | |

* cited by examiner

*Primary Examiner* — Tyler J Lee

(57) ABSTRACT

A rating platform can identify a point of interest (POI) among a first plurality of POIs included in a stop cluster. The rating platform can generate a plurality of unweighted user scores for the POI. Respective unweighted user scores, of the plurality of unweighted user scores is associated, can be associated with respective users of a plurality of users. The rating platform can generate a plurality of weighted user scores for the POI based on the plurality of unweighted user scores and respective weights assigned to respective users of the plurality of users. The rating platform can generate a POI score for the POI based on the plurality of weighted user scores. The rating platform can transmit, based on the POI score, an instruction to display, on the client device, information associated with the POI.

20 Claims, 8 Drawing Sheets

000
OBJECTIVE GENERATION OF A POINT OF INTEREST SCORE BASED ON QUANTITIES OF USER STOPS

RELATED APPLICATION

This application is a continuation of U.S. patent application Ser. No. 16/356,956, entitled "OBJECTIVE GENERATION OF A POINT OF INTEREST SCORE BASED ON QUANTITIES OF USER STOPS" (now U.S. Pat. No. 10,921,151), filed Mar. 18, 2019, which is incorporated herein by reference.

BACKGROUND

A point of interest (POI) is a specific point location, such as a store, an attraction site, a hotel, a fuel station, or the like, that one can find useful or interesting. In a global navigation satellite system (GNSS), a POI can be specified by a name or description, an address, latitude and longitude information, or the like.

DETAILED DESCRIPTION OF PREFERRED EMBODIMENTS

Figure 1A:
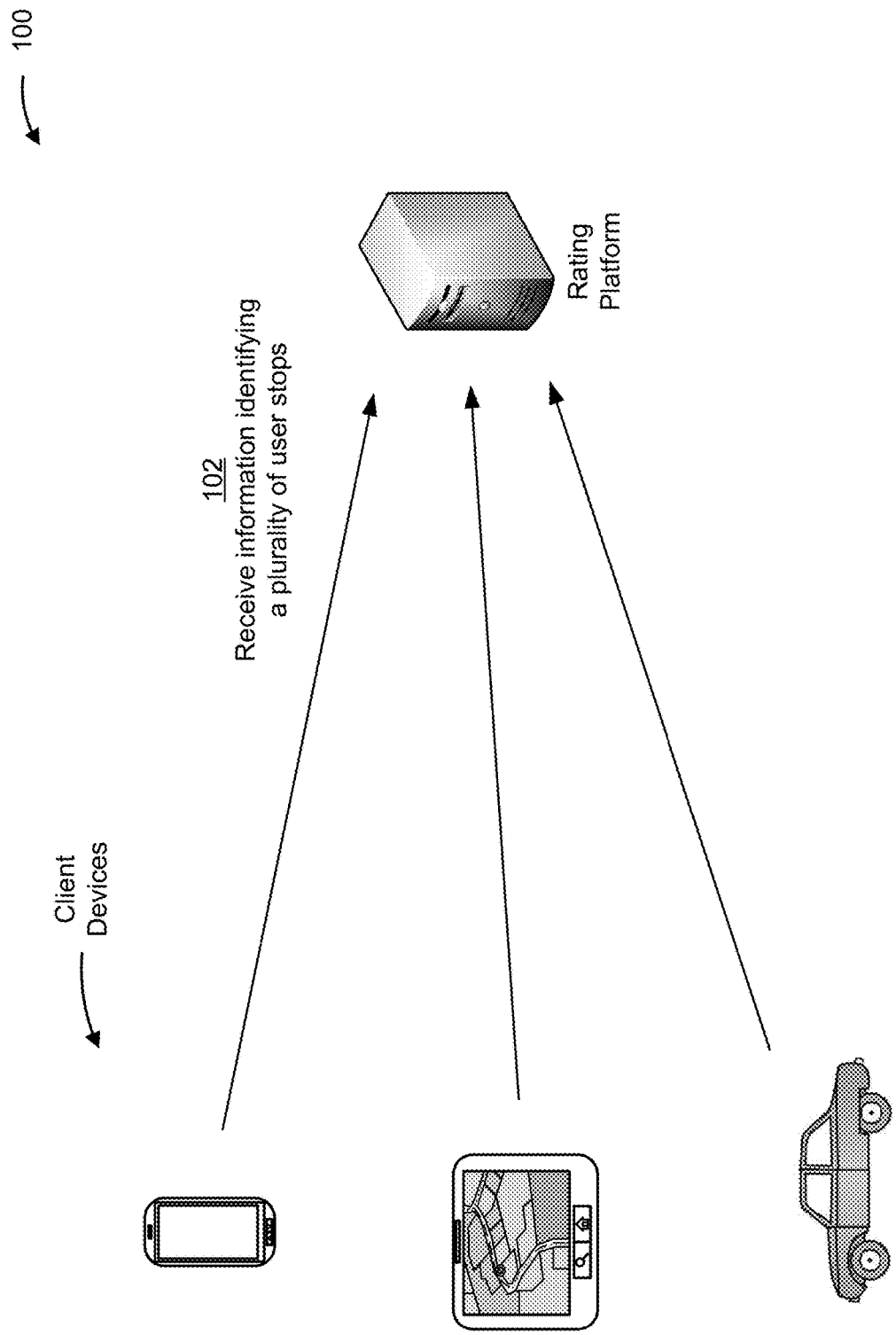
FIGS. 1A-1D are diagrams of an example implementation described herein.

The following detailed description of example implementations refers to the accompanying drawings. The same reference numbers in different drawings can identify the same or similar elements.

A user can use a client device to identify one or more points of interest (POIs). For example, a user can provide input, to the client device, in the form of a query for a particular type of POI (e.g., restaurants, gas stations, and/or the like), and the client device can display information identifying one or more POIs as a response to the query. As another example, the client device can identify a location of the client device, and can identify and display the one or more POIs based on the location of the client device.

In some cases, the client device can communicate with a rating platform to identify one or more POIs. The rating platform can store information identifying respective scores for the one or more POIs. The rating platform can transmit, to the client device, the information identifying the scores for the one or more POIs so that the client device can display the scores along with other information associated with the one or more POIs.

In some cases, a score for a POI can be generated based on user-provided feedback. The user-provided feedback can include a user-provided score (e.g., a user-provided score on a scale of 1 to 5 or another scale, a user-provided binary score such as a "Recommend" or "Do Not Recommend" score, and/or the like), a user-provided narrative review, an average of a plurality of user-provided scores from a plurality of users, and/or the like. User-provided feedback, however, can be subjective, inaccurate, weighted too heavily or lightly, and/or otherwise skewed. For example, user-provided feedback can be provided by a user that received a discount or was paid to provide the user-provided feedback, which can result in biased user-provided feedback. As another example, a user might make a plurality of stops at a POI, and have an overall positive opinion of the POI, but only provide negative feedback as a result of a single negative experience, even though many other user stops by the user at the POI were positive. Other issues with user-provided feedback can occur, such as the user being unable to accurately recall an experience at a POI (e.g., due to a long delay between the user's stop at the POI and the user providing the user-provided feedback), users can forget to provide feedback after a user stop at the POI, and/or the like.

Some implementations described herein provide a rating platform that is capable of generation of an objective POI score based on objective data regarding user stops. In some implementations, the rating platform can generate a POI score based on a quantity of times that users stop at the POI relative to a quantity of times that users stop at other POIs within a threshold distance of the POI. For example, the rating platform can generate an unweighted user score for the POI based on a quantity of times that a user has stopped at the POI relative to a quantity of times that the user has stopped at other POIs within a threshold distance of the POI. The rating platform can apply a user weighting to the unweighted user score based on diversity of user stops of the user (e.g., based on a quantity of different POIs at which the user has stopped within the threshold distance of the POI relative to a quantity of different POIs at which other users have stopped within the threshold distance of the POI). The rating platform can generate the POI score, for the POI, based on the weighted user scores for the POI, and can use the POI score to provide query results, navigation instructions, and/or the like.

In this way, the rating platform can generate a POI score using a rigorous, computerized process and objective data (e.g., the quantity of times that users stop at the POI relative to a quantity of times that users stop at other POIs in a particular geographic area, which can be based on location information associated with client devices of the users, can be based on social media check-ins at the POIs, can be based on confirmed reservations at the POIs, and/or can be based other sources of data that can be used to verify a user stop at a POI) to perform tasks or roles that were not previously performed or were previously performed using subjective human intuition or input (e.g., subjective user-provided feedback), which can remove human subjectivity, unreliability, and waste from the process of generating the POI score. Moreover, since the objective data can be automatically provided (e.g., based on location information associated with a client device), as opposed to the delays and/or missing information that can occur in a system using user-provided feedback, the rating platform can improve speed and efficiency of the process of generating the POI score, which can result in a more accurate POI score and can conserve processor resources, memory resources, and/or the like.

FIGS. 1A-1D are diagrams of an example implementation 100 described herein. As shown in FIGS. 1A-1D, example implementation 100 can include various devices, such as one or more client devices and a rating platform.

In some implementations, a client device can be a device associated with a user. The client device can be a device capable of communicating with the rating platform to receive information associated with one or more POIs. The client device can include an input device (e.g., a touch screen, one or more input peripherals, and/or the like) that permit the user to provide inputs, such as queries for the information associated with one or more POIs, queries for navigation instructions to a POI, and/or the like, and can include a display to display the information associated with one or more POIs, can include a speaker to provide the information associated with one or more POIs via audio, and/or the like. In some implementations, the information associated with a POI can include information identifying the POI (e.g., the name of the POI), information identifying a location of the POI (e.g., an address of the POI), information identifying hours of operation associated with the POI, information identifying a POI score associated with the POI, and/or the like.

In some implementations, the client device can transmit various types of information to the rating platform. As an example, the client device can transmit, to the rating platform (or another type of platform such as a navigation platform), a query for POI information (e.g., via a navigation application on the client device, via a travel management service application on the client device, via a web browser on the client device, and/or the like). As another example, the client device can transmit location information associated with the client device (which can be used as a proximate indicator of the location of the user, of a vehicle associated with the user and/or the client device, and/or the like), information identifying an address (e.g., an origin address for a route, an address near which the user is interested in searching for POIs, and/or the like), user stop information, and/or the like. In some implementations, the user stop information can include information identifying one or more user stops, by the user, at one or more POIs. A user stop can be defined as a user being located at a location of a POI for a threshold amount of time (e.g., 30 minutes, one hour, and/or the like). In some implementations, the threshold amount of time can be different for different types of POIs. For example, the threshold amount of time for hotel POIs can be longer (e.g., 8 hours) relative to the threshold amount of time for restaurant POIs.

In some implementations, the client device can determine whether a user stop has occurred at a—navigation satellite system (GNSS) device (or another type of location detection device) that can generate GNSS data (e.g., positioning coordinates) that indicate the location of the client device. The GNSS device can include a global positioning system (GPS) device, a GLONASS device, a Galileo device, a Beidou device, and/or the like. The client device can use the GNSS data to determine that the client device (and thus, the user) is located at (or within a threshold distance of) a POI. Additionally and/or alternatively, the client device can transmit the GNSS data to the rating platform, and the rating platform can determine whether a user stop has occurred based on the GNSS data.

In some implementations, the client device and/or the rating platform can determine whether a user stop has occurred at a POI based on other indicators that can be used to verify that the user has stopped at the POI. For example, the client device and/or the rating platform can determine whether a user stop has occurred at a POI based on a social media check-in by the user on one or more social media platforms. As another example, the client device and/or the rating platform can determine whether a user stop has occurred at a POI based on the user attending and completing a reservation at the POI (e.g., based on a reservation platform confirming that the user attended a reservation at the POI).

In some implementations, the rating platform can generate, store, and provide information associated with POI scores for a plurality of POIs. For example, the rating platform can generate a POI score for a POI, can receive a POI query from a client device, can identify information associated with one or more POIs based on receiving the POI query, can provide the information associated with the one or more POIs, and/or the like.

As shown in FIG. 1A, and by reference number 102, to generate a POI score for a POI, the rating platform can receive information identifying a plurality of user stops, by a plurality of users, at a plurality of POIs. As indicated above, the rating platform can receive the information identifying the plurality of user stops from the client devices. Additionally and/or alternatively, the rating platform can receive location information associated with the client devices, and can determine the plurality of user stops based on the location information.

In some implementations, a client device can provide information identifying a user stop based on determining that the user stop has occurred. For example, the client device can determine that the client device has been located at a POI for a threshold amount of time, and can transmit, to the rating platform, information identifying the user stop based on determining that the client device has been located at the POI for the threshold amount of time. In some implementations, a client device can provide information identifying one or more user stops during a particular time interval, at a particular time of day, and/or the like.

In some implementations, information identifying a user stop can include information identifying the POI associated with the user stop, a time of day of the user stop, a duration of the user stop, and/or the like. In some implementations, the information identifying the user stop can include information identifying an identity of the user associated with the user stop (e.g., a user name), and/or the like. In this way, the rating platform can aggregate and store the information identifying the plurality of POIs by POI as well as by user.

Figure 1B:
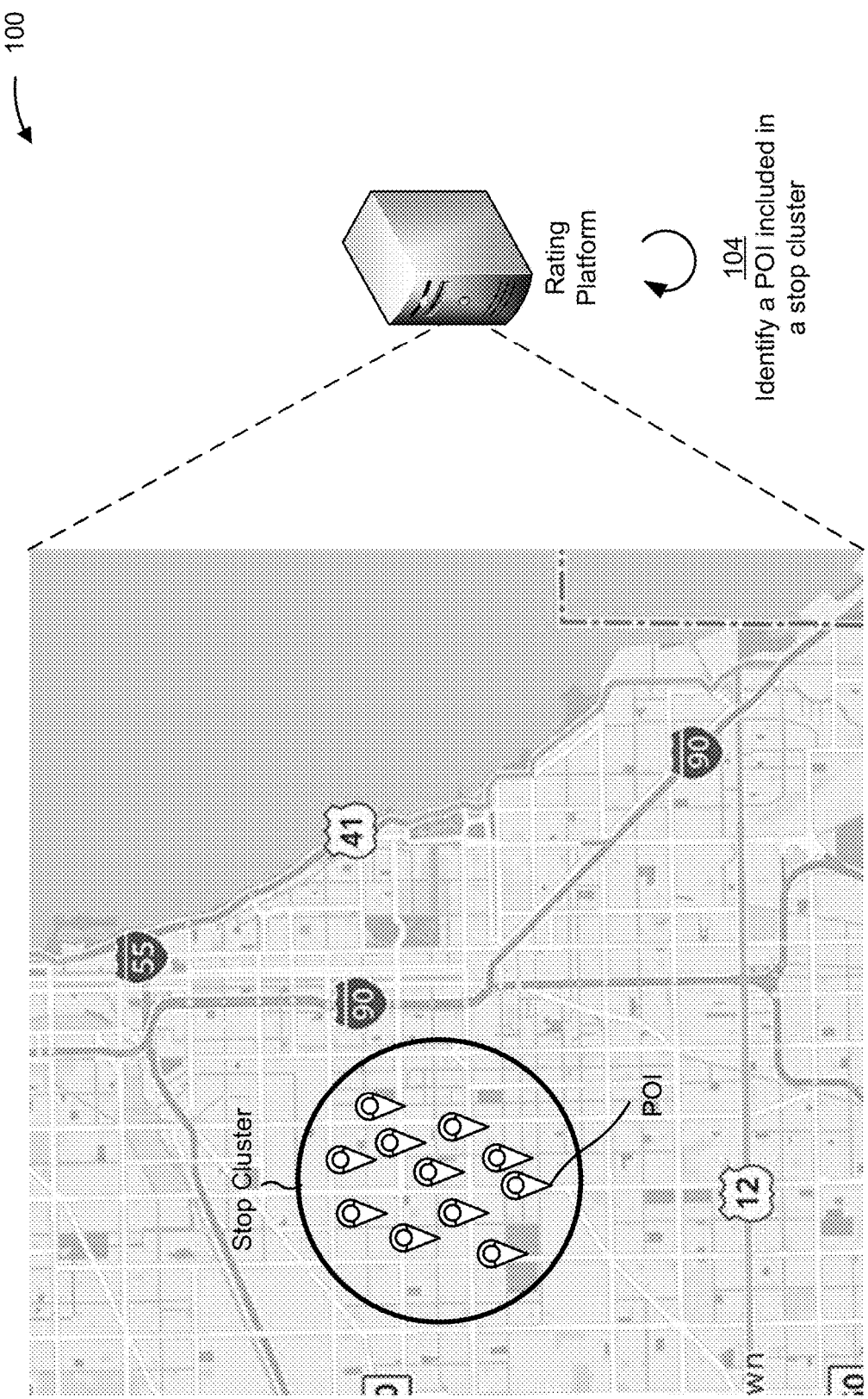

As shown in FIG. 1B, the rating platform can use the information identifying the plurality of POIs to generate stop clusters of POIs. In some implementations, a stop cluster can include a geographic area in which a threshold quantity of user stops has occurred within a time period threshold (e.g., a day, a period of multiple days, and/or the like). The size of the geographic area included in the stop cluster, the threshold quantity of user stops, and/or the time period threshold can be configurable, for example, based on a type of geographic area (e.g., a city, a rural town, and/or the like), based on a POI density in the geographic area, based on population in the geographic area, based on population density in the geographic area, and/or the like. In some implementations, a stop cluster can include a geographic area in which a density of POIs satisfies a density threshold, which can be configurable, for example, based on a type of geographic area, based on a POI density in the geographic area, based on population in the geographic area, based on population density in the geographic area, and/or the like. In some implementations, a stop cluster can include a single POI.

In some implementations, stop clusters can be generated according to POI type. For example, the rating platform can generate a stop cluster for restaurant POIs, can generate a stop cluster for gas station POIs, and/or the like. In this case, each stop cluster can have a particular set of parameters for geographic area size, threshold quantity of user stops, time period threshold, POI density, and/or the like.

In some implementations, the rating platform can generate a stop cluster using one or more machine learning clustering algorithms based on the plurality of user stops (e.g., by identifying clusters of user stops using the clustering algorithms). For example, the rating platform can generate a stop cluster using a density-based spatial clustering of applications with noise (DBSCAN) clustering algorithm, a balanced iterative reducing and clustering using hierarchies (BIRCH) clustering algorithm, a k-means clustering algorithm, and/or the like. In some implementations, the rating platform can train a machine learning model for a clustering algorithm using seed sets of previously generated stop clusters. Moreover, the rating platform can present the generated stop clusters to a user to provide feedback, and can use the feedback to further train and refine the machine learning model.

In some implementations, the rating platform can store information, associated with generated stop clusters, in a data structure (e.g., a database, a structure electronic file such as an extensible markup language (XML) file or a JavaScript object notation (JSON) file, a memory device, a storage device, and/or the like). The information associated with a stop cluster can include information identifying a location of the stop cluster (e.g., positioning coordinates associated with the location of the stop cluster, a city associated with the stop cluster, and/or the like), information identifying a rank or popularity of the stop cluster (e.g., relative to other stop clusters within a threshold distance of the stop cluster, relative to other stop clusters located in a same geographic area as the stop cluster, such as a city and/or state, and/or the like). The popularity and/or rank of a stop cluster can be based on a total quantity of user stops that occurred in a particular time period (e.g., a day, a duration of multiple days, and/or the like).

As further shown in FIG. 1B, and by reference number 104, the rating platform can select a stop cluster and can identify a POI, included in the stop cluster, for which to generate a POI score. In some implementations, the POI may be among a plurality of POIs included in the stop cluster. In some implementations, the stop cluster can include a single POI. In some implementations, generating a POI score can include generating a new POI score for the POI. In some implementations, generating a POI score can include generating an updated POI score for the POI.

In some implementations, the rating platform can identify the POI and generate the POI score for the POI "on-demand" (e.g., in response to a user query for information associated with one or more POIs). In some implementations, the rating platform can identify the POI and generate the POI score for the POI "offline" in that the rating platform identifies the POI and generates the POI score without a particular request or query for POI information. For example, the rating platform can generate the POI score for the POI offline at a particular frequency (e.g., once a week, once a day, once a month, and/or the like). In some implementations, the rating platform can identify the POI and generate the POI score based on receiving information identifying a user stop at the POI. In some implementations, the rating platform can identify the POI and generate the POI score based on receiving location information associated with a user device and determining that a user stop has occurred at the POI.

In some implementations, prior to selecting the POI, the rating platform can filter the plurality of POIs included in the stop cluster. For example, the rating platform can filter the plurality of POIs by POI type, such that the rating platform can generate POI scores, for example, for only shopping POIs or another type of POI. The rating platform can use various techniques to filter the plurality of POIs by POI type, such as using a Standard Industrial Classification (SIC) code associated with the plurality of POIs and/or another type of tag, identifier, and/or metadata associated with the plurality of POIs to identify the POI type of the plurality of POIs.

Figure 1C:
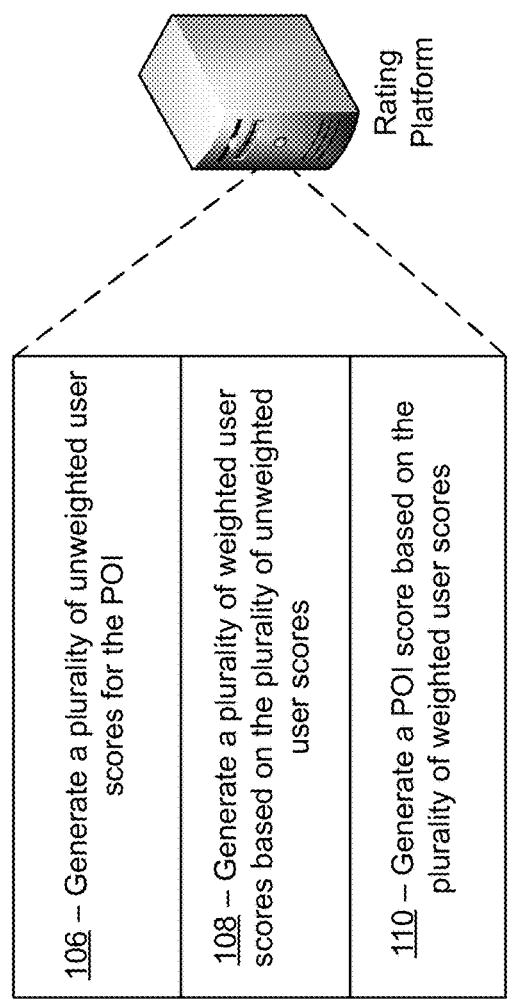

As shown in FIG. 1C, and by reference number 106, to generate a POI score for the POI, the rating platform can generate a plurality of unweighted user scores for the POI. An unweighted user score can be a user score that is given for the POI by a particular user (or client device). Accordingly, the plurality of unweighted user scores can be respectively associated with a plurality of users.

An unweighted user score can be generated using one or more objective sources of data, as opposed to user-provided feedback, as an objective measure of a user's rating for the POI. The objective sources of data can include the quantity of user stops that the user has made at the POI and the quantity of user stops that the user has made at other POIs of the same POI type near the POI. In this way, the unweighted user score that the user gives to the POI is based on how many times the user stops at the POI relative to how many times the user stops at other POIs of the same POI type near the POI. The more the user stops at the POI relative to the other POIs, the higher the unweighted user score can be. This removes human/user subjectivity from the unweighted user score because the rating platform generates the unweighted user score based on the user's actions as opposed to the user's subjective perception of what the score for the POI should be. The unweighted user score V(d, r) for user d and POI r can be generated based on Equation 1:

$$V(d, r) = \frac{S(d, r) - \mu(d)}{\sigma(d)} \qquad \text{Equation 1}$$

where S(d, r) is the quantity of user stops of user d at POI r, and μ(d) and σ(d) are the mean and standard deviation, respectively, of the user stops made by user d among all the POIs near the POI, including the POI. Equation 1 can represent the preferences of user d: a high unweighted user score is given to POIs where the user stopped relatively more often than the user's average number of stops at other POIs near the POI, while taking into account the user's propensity to try different POIs of the same POI type.

In some implementations, the quantity of user stops at the POI and at the other POIs can be overall quantities of user stops (e.g., all-time user stops) or quantities of user stops that occur in a particular time period (e.g., the last 30 days, the last three months, and/or the like). In some implementations, the other POIs near the POI, which the rating platform uses to generate the unweighted user score for the POI, can be based on a distance threshold (e.g., a 10 mile radius from the POI, a 5 mile square with the POI at the center of the square, and/or the like), can be based on a political boundary (e.g., a city, a state, and/or the like), can be based on regions of interest (ROI) such as shopping areas or other areas that have a high density of POIs, can be based on a stop cluster, and/or the like.

The rating platform can normalize the unweighted user score to a rating scale. The rating scale can include any rating scale, such as a 1 through 5 scale, a 1 through 10 scale, a percentage-based scale, and/or the like. As an example, the rating platform can generate a normalized unweighted user score R (d, r) for a 1 through 5 rating scale based on Equation 2:

$$R(d, r) = 1 + 4 \frac{V(d, r)}{M(d) - m(d)} \quad \text{Equation 2}$$

where M(d) and m(d) are respectively the highest and lowest unweighted user scores associated with user d.

As further shown in FIG. 1C, and by reference number 108, the rating platform can generate a plurality of weighted user scores based on the plurality of unweighted user scores and respective weights assigned to the plurality of users. A weight assigned to a user can represent an authority score for the user in that a user who has a more diverse user stop history (and thus has experienced more POIs of the same POI type as the POI) can be assigned a higher weight relative to another user who has stopped at fewer different POIs of the same POI type as the POI.

To assign a weight to a user, the rating platform can compare the user with other users that have stopped at the POI and the other POIs near the POI. As an example, the rating platform can assign a weight W (d) to user d based on Equation 3:

$$W(d) = S(d) - \mu_t(S) \quad \text{Equation 3}$$

where S(d) can be the quantity of user stops of user d at the POI and the other POIs, and μ(S) is the average number of user stops of all of the users at POI and the other POIs. In this case, the rating platform can assign a zero weight to a user that has stopped an average quantity of times, and can assign a positive weight or a negative weight to a user that has respectively stopped more or less often than the average.

In some implementations, the rating platform can compress the weights that are assigned to the plurality of users using a function such as a sigmoid function. The resulting weights can be between 0 and 1. As an example, the rating platform can compress the weights based on Equation 4:

$$A(d) = \frac{\exp[W(d)]}{\exp[W(d)] + 1} \quad \text{Equation 4}$$

The rating platform can generate a weighted user score for a user by multiplying the user's normalized unweighted user score R (d, r) by the user's weight A(d).

As further shown in FIG. 1C, and by reference number 110, the rating platform can generate the POI score for the POI based on the plurality of weighted scores for the POI. In some implementations, the rating platform can generate the POI score for the POI by averaging the plurality of weighted scores for the POI. In some implementations, the rating platform can generate the POI score for the POI by using the plurality of weighted scores in another type of rating function or equation. Once the rating platform has generated the POI score for the POI, the rating platform can store the POI score for the POI in a score data store, which can include a data structure such as an electronic file, a database, a file system, and/or the like. The rating platform can continue to generate POI scores for the remaining POIs in the stop cluster using the actions and techniques described above in connection with reference numbers 106-110.

Figure 1D:
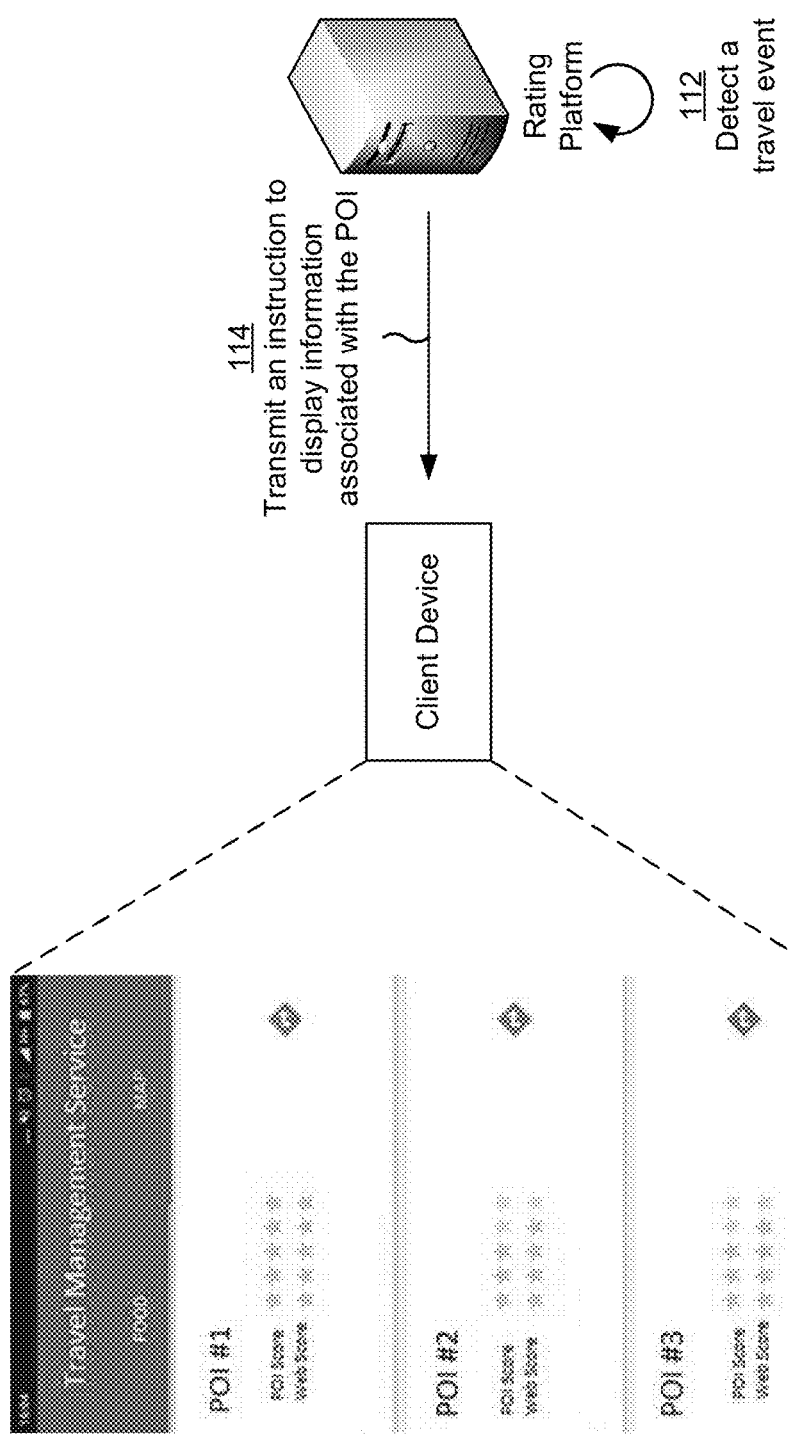

Turning to FIG. 1D, the rating platform can use the POI scores, stored in the score data store, to provide information associated with one or more POIs to a client device. As shown by reference number 112, the rating platform can detect an event associated with the client device and can provide the information associated with one or more POIs based on detecting the event. In some implementations, the event can include receiving a query for POI information from the client device, detecting a query for navigation instructions (e.g., received at the rating platform, received at another platform such as a navigation platform, and/or the like), and/or the like. In some implementations, the event can be based on a location of the client device. For example, the rating platform can determine that the client device is located within a threshold distance of the one or more POIs (e.g., one mile, five miles, and/or the like) based on GPS data generated by the client device. As another example, the rating platform can determine that the client device is located within a threshold distance of a POI, of the one or more POIs, at which the user has previously stopped. As another example, the rating platform can determine that the client device is located within an ROI in which the one or more POIs are located. In some implementations, the event can include determining that a particular time of day is approaching (e.g., at time at which the user of the client device typically eats lunch or dinner, a time at which the user travels to a workplace or travels from the workplace to a home location, and/or the like). In some implementations, the event can include determining that the client device is located within a threshold distance of the one or more POIs at a particular time of day.

As further shown in FIG. 1D, and by reference number 114, the rating platform can transmit, to the client device, the information associated with one or more POIs and an instruction to display the information associated with one or more POIs. In some implementations, the client device can display the information associated with one or more POIs in a user interface of an application or web browser. For example, the client device can display the information associated with one or more POIs on an electronic map that is displayed in a navigation application. As another example, and as illustrated in FIG. 1D, the client device can display the information associated with one or more POIs in a user interface of a travel management service application. The user interface of the travel management service application can display a list of the one or more POIs, the respective addresses of the one or more POIs, visual indications of the respective POI scores of the one or more POIs (e.g., which can be indicated by stars, dots, and/or any other type of visual indicator), visual indications of respective web scores for the one or more POIs (e.g., scores that are generated based on subjective user-provided feedback, so that the user can compare the objective POI score and the subjective web score), and/or the like. In some implementations, the user interface of the travel management service application can display an icon, for each POI of the one or more POIs, that permits a user to provide input to display navigation instructions to a POI. In this way, the user can select a POI, and the client device can display navigation instructions to the POI (e.g., via the travel management service application, via a navigation application, via a web browser, and/or the like).

In some implementations, the client device can display the one or more POIs in an order that is based on the POI scores for the one or more POIs. In some implementations, the one or more POIs, that are displayed by the client device, can be selected based on respective POI scores for the one or more POIs. For example, the rating platform can select the one or more POIs based on the respective POI scores, for the one or more POIs, satisfying a POI score threshold (e.g., a 4 out of 5 POI score or greater).

In this way, the rating platform can generate a POI score for a POI using a rigorous, computerized process and objective data (e.g., the quantity of times that users stop at the POI relative to a quantity of times that users stop at other POIs in a particular geographic area, which can be based on location information associated with client devices of the users, can be based on social media check-ins at the POIs, can be based on confirmed reservations at the POIs, and/or can be based on other sources of data that can be used to verify a user stop at a POI) to perform tasks or roles that were not previously performed or were previously performed using subjective human intuition or input (e.g., subjective user-provided feedback), which can remove human subjectivity and waste from the process of generating the POI score. Moreover, since the objective data can be automatically provided (e.g., based on location information associated with a client device), as opposed to the delays and/or missing information that can occur in using user-provided feedback, the rating platform can improve speed and efficiency of the process of generating the POI score, which can result in a more accurate POI score and can conserve processor resources, memory resources, and/or the like.

As indicated above, FIGS. 1A-1D are provided as an example. Other examples can differ from what is described with regard to FIGS. 1A-1D.

Figure 2:
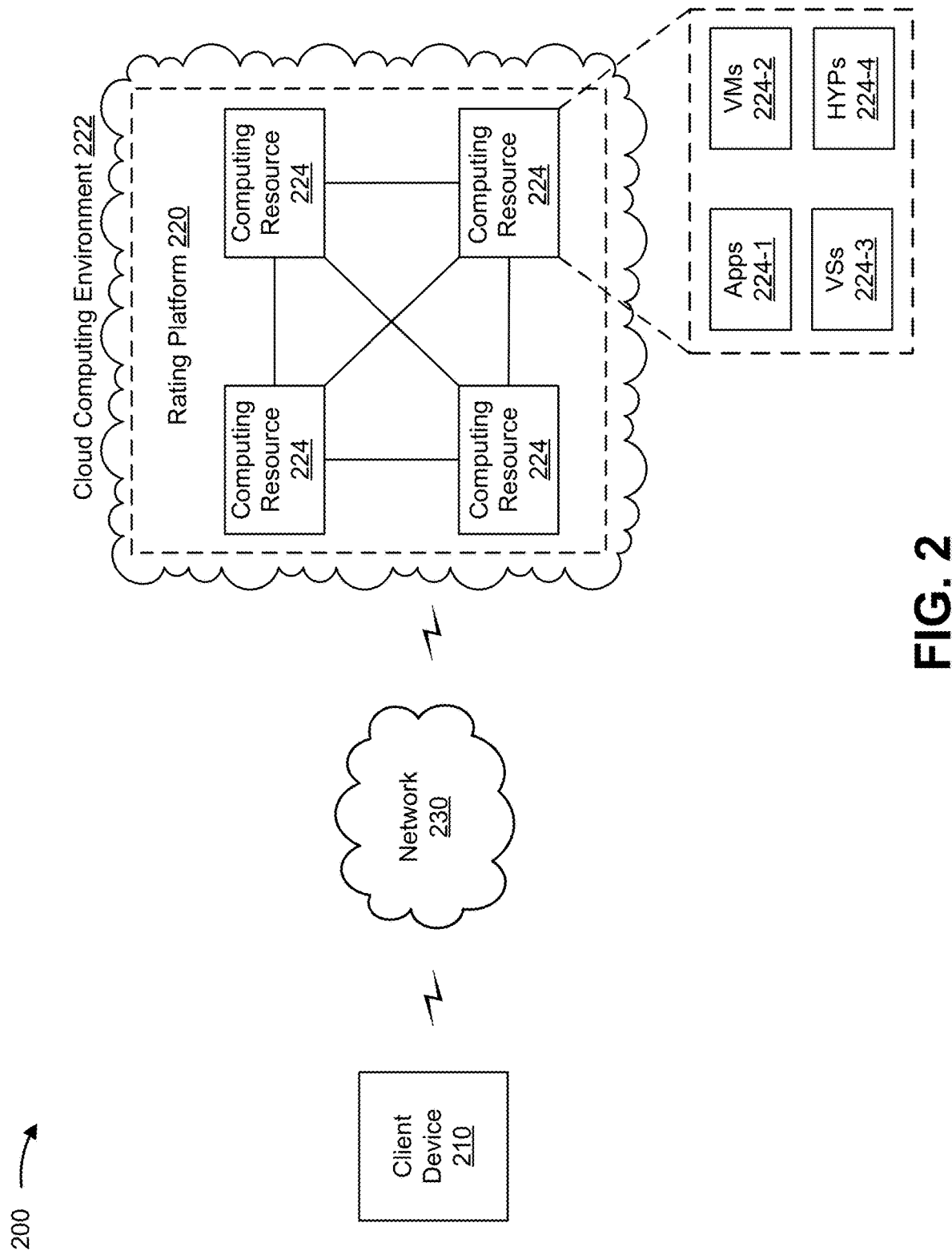
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a client device 210, a rating platform 220, a cloud computing environment 222, a computing resource 224, and a network 240. Devices of environment 200 can interconnect via wired connections, wireless connections, or a combination of wired and wireless connections.

Client device 210 includes one or more devices capable of receiving, generating, storing, processing, and/or providing information associated with generation of an objective POI score based on quantities of user stops. For example, client device 210 can include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a stand-alone navigation device, a device that is integrated into a vehicle (e.g., a built-in navigation device, an infotainment system device, and/or the like), and/or a similar type of device.

In some implementations, client device 210 can be a device capable of communicating with rating platform 220 to receive various types of information, such as information associated with one or more POIs (e.g., names of POIs, addresses of POIs, POI ratings, and/or the like), navigation information (e.g., information identifying one or more navigation directions to a POI), and/or the like. In some implementations, client device 210 can transmit various types of information to rating platform 220. For example, client device 210 can transmit location information associated with client device 210 (e.g., GNSS data identifying geographic coordinates of client device 210), one or more queries (e.g., a query for navigation directions to a POI, a query for information associated with one or more POIs, and/or the like), information identifying one or more user stops at one or more POIs, and/or the like.

Rating platform 220 includes one or more computing resources capable of receiving, generating, storing, processing, and/or providing data associated with generation of an objective POI score based on quantities of user stops. For example, rating platform 220 can be a platform implemented by cloud computing environment 222. In some implementations, rating platform 220 is implemented by computing resources 224 of cloud computing environment 222. In some implementations, rating platform 220 can receive, from client device 210, information identifying one or more user stops at one or more POIs, location information associated with client device 210, queries for navigation instructions, queries for information associated with one or more POIs, and/or the like.

In some implementations, rating platform 220 can identify a POI included in a stop cluster, can generate a plurality of unweighted user scores for the POI, can generate a plurality of weighted user scores for the POI, can generate a POI score for the POI based on the plurality of weighted user scores, and/or the like. In some implementations, the stop cluster can include a single POI. In some implementations, the stop cluster can include a plurality of POIs, and rating platform 220 can identify the POI among the plurality of POIs included in the stop cluster. In some implementations, rating platform 220 can transmit, based on the POI score, an instruction to display, on client device 210, information associated with the POI based on detecting an event associated with client device 210, based on a particular time of day, and/or the like.

Cloud computing environment 222 includes an environment that hosts rating platform 220. Cloud computing environment 222 can provide computation, software, data access, storage, and/or other services that do not require end-user knowledge of a physical location and configuration of a system and/or a device that delivers the services. As shown, cloud computing environment 222 can include rating platform 220 and computing resource 224.

Computing resource 224 includes one or more personal computers, workstation computers, server devices, or another type of computation and/or communication device. In some implementations, computing resource 224 can host rating platform 220. The cloud resources can include compute instances executing in computing resource 224, storage devices provided in computing resource 224, data transfer devices provided by computing resource 224, and/or the like. In some implementations, computing resource 224 can communicate with other computing resources 224 via wired connections, wireless connections, or a combination of wired and wireless connections.

As further shown in FIG. 2, computing resource 224 can include a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that can be provided to or accessed by client device 210. Application 224-1 can eliminate a need to install and execute the software applications on client device 210. For example, application 224-1 can include software associated with rating platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., a user of client device 210), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 can include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
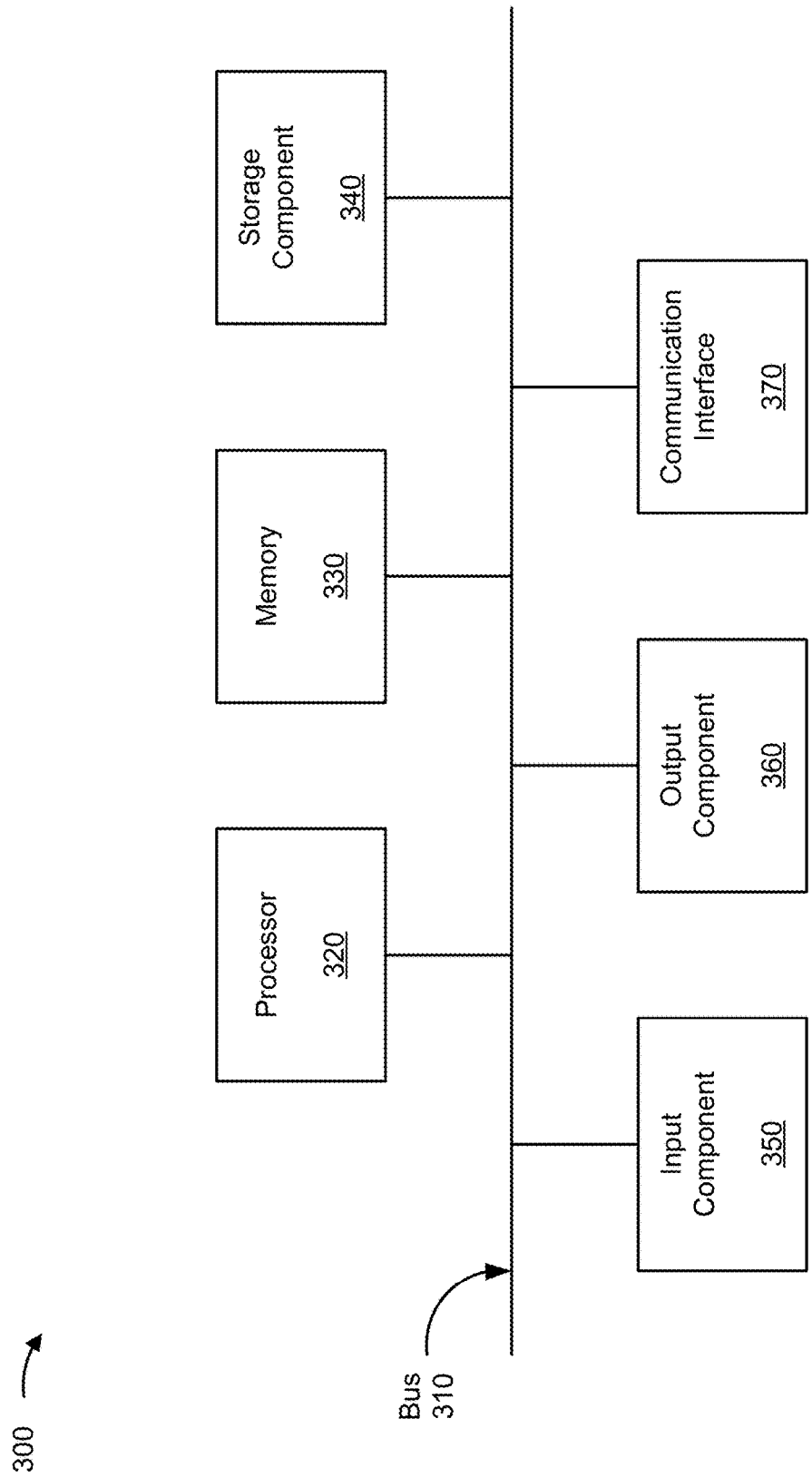
FIG. 3 is a diagram of example components of one or more devices of FIG. 2.

FIG. 3 is a diagram of example components of a device 300. Device 300 can correspond to client device 210, rating platform 220, computing resource 224, and/or one or more devices included in network 230. In some implementations, client device 210, rating platform 220, computing resource 224, and/or one or more devices included in network 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
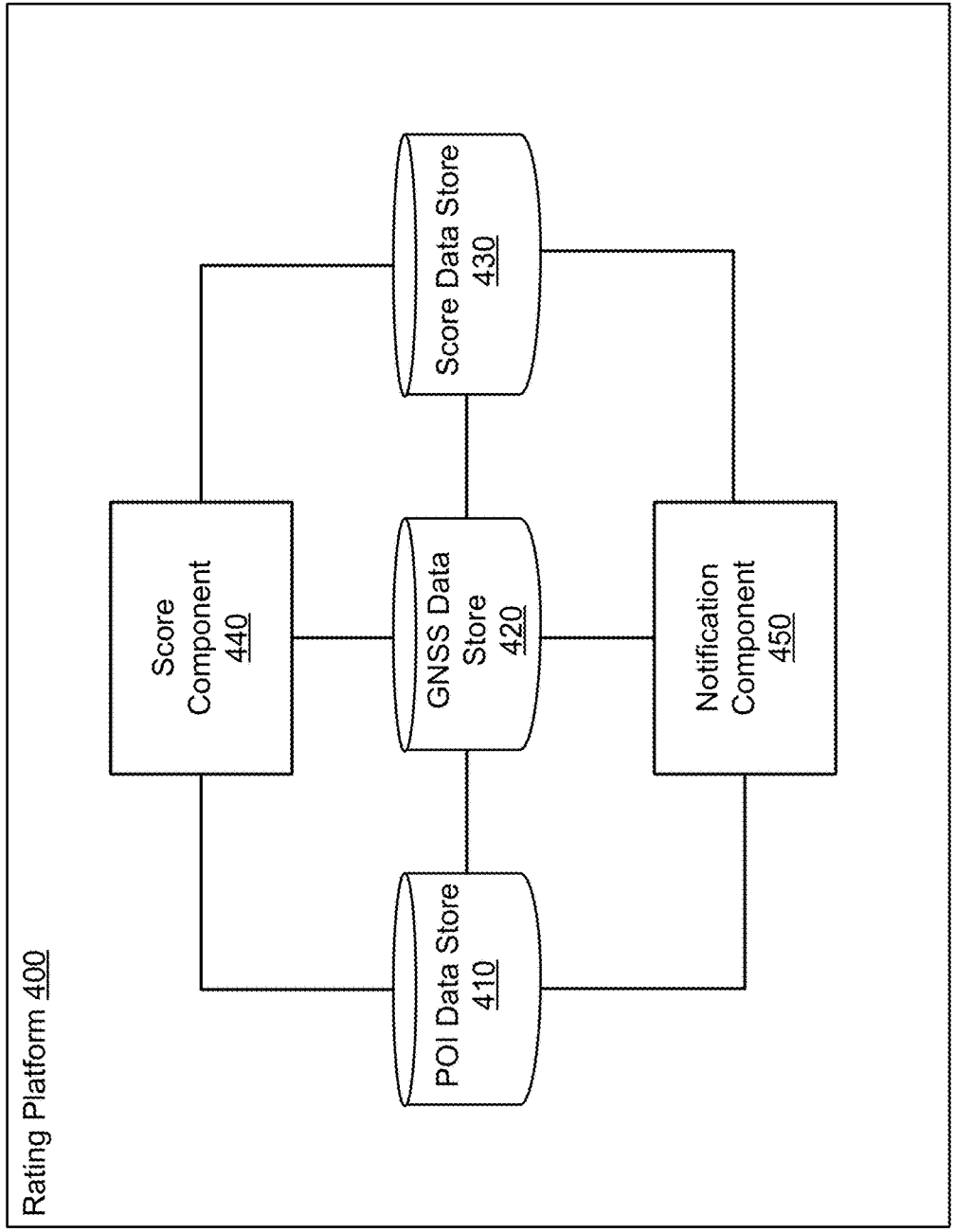
FIG. 4 is a diagram of an example rating platform described herein.

FIG. 4 is a diagram of an example rating platform (e.g., rating platform 400), as described herein. Rating platform 400 can be capable of generating objective POI scores for POIs based on quantities of user stops. In some implementations, rating platform 400 can be implemented by rating platform 220 of FIG. 2, by device 300 of FIG. 3, by one or more components of device 300, and/or the like.

As shown in FIG. 4, rating platform 400 can include various components, such as a POI data store 410, a GNSS data store 420, a score data store 430, a score component 440, a notification component 450, and/or the like. In some implementations, the components included in FIG. 4 can be implemented by separate components and/or devices, can be included in the same component and/or device, and/or the like.

POI data store 410 can store information associated with one or more POIs. In some implementations, POI data store 410 can include a memory device, a storage device, a computing resource, a database, a file system, one or more electronic files, and/or the like. In some implementations, the information associated with the one or more POIs can include information identifying the one or more POIs, address information associated with the one or more POIs, information identifying stop clusters of POIs, information identifying ROIs in which the one or more POIs can be located, and/or the like.

GNSS data store 420 can store location information associated with one or more client devices. In some implementations, GNSS data store 420 can include a memory device, a storage device, a computing resource, a database, a file system, one or more electronic files, and/or the like. In some implementations, the location information can include GNSS data received from the one or more client devices, can include information identifying one or more user stops at the one or more POIs identified in POI data store 410, and/or the like.

Score data store 430 can store information identifying POI scores for the one or more POIs included in POI data store 410. In some implementations, score data store 430 can include a memory device, a storage device, a computing resource, a database, a file system, one or more electronic files, and/or the like. In some implementations, score component 440 can generate POI scores and store, in score data store 430, information identifying the POI scores. In some implementations, score component 440 can generate a POI score by identifying a POI among the one more POIs identified in POI data store 410, generating a plurality of unweighted user scores for the POI, generating a plurality of weighted scores based on the plurality of unweighted user scores, and generating the POI score based on the plurality of weighted scores.

Notification component 450 can monitor GNSS data store 420, and can provide, to a client device, the information identifying POI scores that is stored in score data store 430. For example, notification component 450 can identify a location of the client device based on the GNSS data stored in GNSS data store 420, can identify one or more POIs, identified in POI data store 410, that are located within a threshold distance from the client device's location (or located within an ROI in which the client device is located), can identify POI scores, stored in score data store 430, associated with the one or more POIs, and can provide information associated with the one or more POIs and the POI scores to the client device.

The number and arrangement of components shown in FIG. 4 are provided as an example. In practice, rating platform 400 can include additional components, fewer components, different components, or differently arranged components than those shown in FIG. 4. Additionally, or alternatively, a set of components (e.g., one or more components) of rating platform 400 can perform one or more functions described as being performed by another set of components of rating platform 400.

Figure 5:
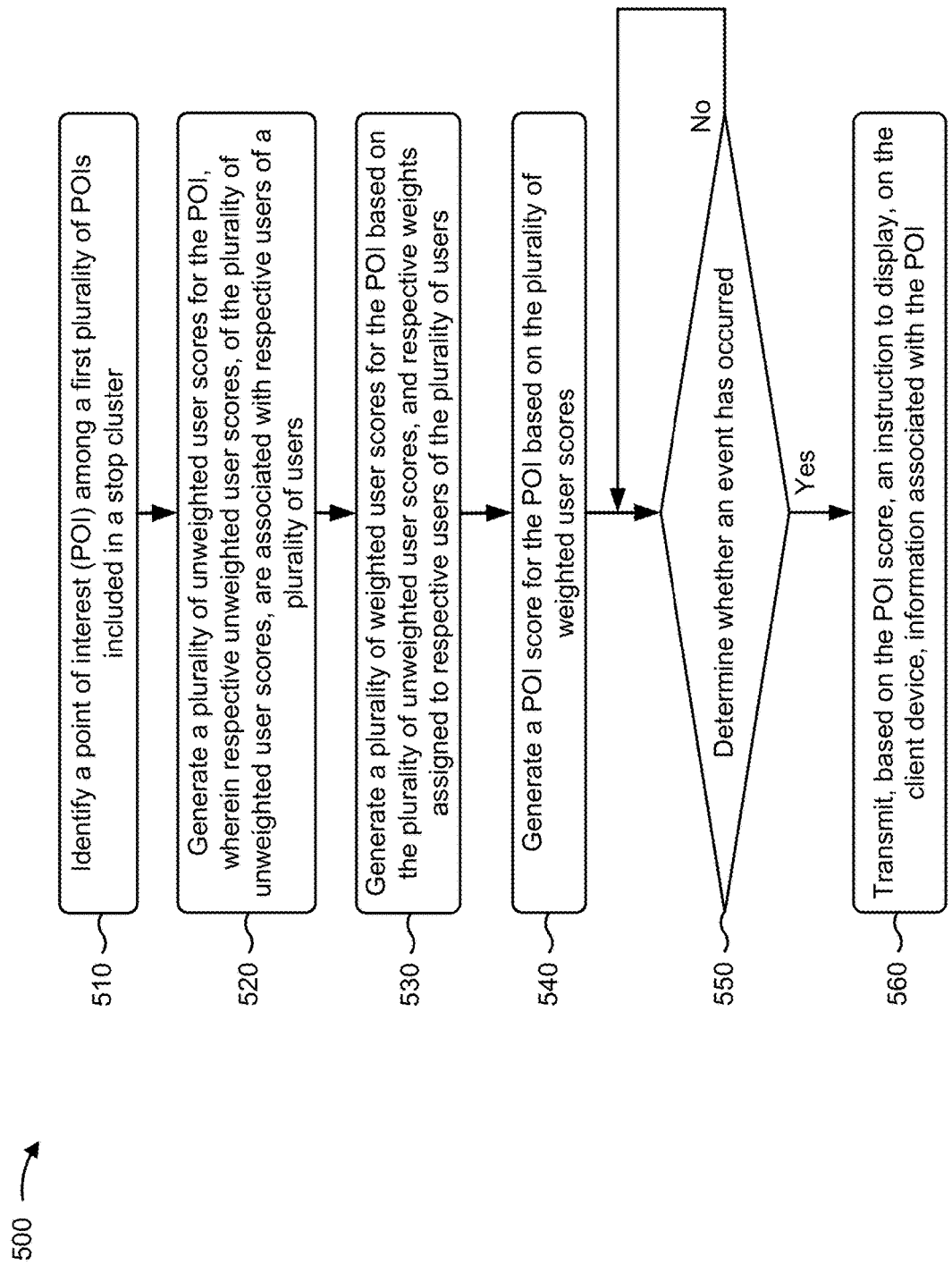
FIG. 5 is a flow chart of an example process for objective generation of a point of interest (POI) score based on quantities of user stops.

FIG. 5 is a flow chart of an example process 500 for objective generation of a POI score based on quantities of user stops. In some implementations, one or more process blocks of FIG. 5 can be performed by a rating platform (e.g., rating platform 220, rating platform 400, and/or the like). In some implementations, one or more process blocks of FIG. 5 can be performed by another device or a group of devices separate from or including the rating platform, such as a client device (e.g., client device 210) and/or the like.

As shown in FIG. 5, process 500 can include identifying a POI among a first plurality of POIs included in a stop cluster (block 510). For example, the rating platform (e.g., using processor 320, memory 330, storage component 340, input component 350, output component 360, communication interface 370 and/or the like) can identify a POI among a first plurality of POIs included in a stop cluster, as described above.

As further shown in FIG. 5, process 500 can include generating a plurality of unweighted user scores for the POI, wherein respective unweighted user scores, of the plurality of unweighted user scores, are associated with respective users of a plurality of users wherein an unweighted user score, of the plurality of unweighted user scores, is based on a first quantity of user stops, by the user, at the POI, and a second quantity of user stops, by the user, at other POIs among a second plurality of POIs that are located within a threshold distance from the POI, and wherein at least a subset of the first quantity of user stops and the second quantity of user stops is based on GNSS data generated by a client device (block 520). For example, the rating platform (e.g., using processor 320, memory 330, storage component 340, input component 350, output component 360, communication interface 370 and/or the like) can generate a plurality of unweighted user scores for the POI, as described above. In some aspects, respective unweighted user scores, of the plurality of unweighted user scores, are associated with respective users of a plurality of users. In some aspects, an unweighted user score, of the plurality of unweighted user scores, is based on a first quantity of user stops, by the user, at the POI, and a second quantity of user stops, by the user, at other POIs among a second plurality of POIs that are located within a threshold distance from the POI. In some implementations, at least a subset of the first quantity of user stops and the second quantity of user stops is based on GNSS data generated by a client device.

As further shown in FIG. 5, process 500 can include generating a plurality of weighted user scores for the POI based on the plurality of unweighted user scores and respective weights assigned to respective users of the plurality of users (block 530). For example, the rating platform (e.g., using processor 320, memory 330, storage component 340, input component 350, output component 360, communication interface 370 and/or the like) can generate a plurality of weighted user scores for the POI based on the plurality of unweighted user scores and respective weights assigned to respective users of the plurality of users, as described above.

As further shown in FIG. 5, process 500 can include generating a POI score for the POI based on the plurality of weighted user scores (block 540). For example, the rating platform (e.g., using processor 320, memory 330, storage component 340, input component 350, output component 360, communication interface 370 and/or the like) can generate a POI score for the POI based on the plurality of weighted user scores, as described above.

As further shown in FIG. 5, process 500 can include determining whether an event has occurred (block 550). For example, the rating platform (e.g., using processor 320, memory 330, storage component 340, input component 350, output component 360, communication interface 370 and/or the like) can determine whether an event has occurred, as described above. As further shown in FIG. 5, if the rating platform determines that an event has occurred (block 550—No), process 500 can return to block 530, where the rating platform can continue to monitor for events.

As further shown in FIG. 5, if the rating platform determines that an event has occurred (block 550—Yes), process 500 can include transmitting, based on the POI score, an instruction to display, on the client device, information associated with the POI (block 560). For example, the rating platform (e.g., using processor 320, memory 330, storage component 340, input component 350, output component 360, communication interface 370 and/or the like) can transmit, based on the POI score, an instruction to display, on the client device, information associated with the POI, as described above.

Process 500 can include additional implementations, such as any single implementation or any combination of implementations described below and/or in connection with one or more other processes described elsewhere herein.

In some implementations, transmitting the instruction to display the information associated with the POI comprises at least one of transmitting the instruction to display the information associated with the POI based on determining that the client device is located within another threshold distance from the POI, transmitting the instruction to display the information associated with the POI based on receiving a query for POIs within a threshold distance of a particular location, or transmitting the instruction to display the information associated with the POI based on a time of day. In some implementations, the stop cluster corresponds to a particular geographic area, and process 500 further comprises identifying the geographic area as the stop cluster based on a density of the plurality of POIs, within the geographic area, satisfying a density threshold, or a third quantity of user stops, within the geographic area, satisfying a threshold quantity of user stops in a particular time period.

In some implementations, generating the unweighted user score for the user comprises receiving information identifying a plurality of user stops, by the user, at the POI and the second plurality of POIs, determining a standard deviation for the plurality of user stops, determining an average quantity of user stops, of the plurality of user stops, for the POI and the second plurality of POIs, wherein the information identifying the plurality of user stops comprises the GNSS data, and determining the first quantity of user stops based on the plurality of user stops; and generating the unweighted user score for the user based on the first quantity of user stops, the standard deviation for the plurality of user stops, and the average quantity of user stops.

In some implementations, generating the unweighted user score for the user comprises: normalizing the unweighted user score for the user to a rating scale based on a highest unweighted user score associated with the user and a lowest unweighted user score associated with the user. In some implementations, process 500 comprises generating a weight assigned to the user, of the plurality of users, based on a quantity of POIs, within a threshold distance of the POI, at which the user has stopped, and a quantity of POIs, within the threshold distance of the POI, at which other users of the plurality of users have stopped. In some implementations, generating the POI score for the POI comprises determining an average weighted user score of the plurality of weighted user scores, and selecting the average weighted user score as the POI score.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive location information associated with a plurality of stops by a plurality of users at one or more points of interest (POIs) associated with a stop cluster;
      generate, based on the location information, a plurality of unweighted user scores, for the one or more POIs, associated with the plurality of users,
      generate, based on the plurality of unweighted user scores and a respective weight assigned to each user of the plurality of users, a plurality of weighted user scores for the one or more POIs associated with the stop cluster;
      generate, based on the plurality of weighted user scores, a POI score for the one or more POIs associated with the stop cluster; and
      provide, using the POI score for the one or more POIs associated with the stop cluster, information associated with the one or more POIs, or information associated with the stop cluster, to another device.

2. The device of claim 1, wherein the one or more processors, when generating the plurality of unweighted user scores, are to:
   generate, using one or more data sources associated the plurality of stops of the plurality of users at a particular POI or another POI that is a same type as the particular POI, the plurality of unweighted user scores,
      wherein the one or more data sources excludes user-provided feedback, and
      wherein the stop cluster is associated with the particular POI.

3. The device of claim 2, wherein the one or more data sources includes information associated with a first quantity of user stops that the plurality of users have made at the one or more POIs associated with the stop cluster, and information associated with a second quantity of user stops that the plurality of users have made at other POIs, of a same type as a corresponding one of the one or more POIs associated with the stop cluster, located in physical proximity to the particular POI.

4. The device of claim 1, wherein the one or more processors are to:
   normalize the plurality of unweighted user scores to a rating scale to produce a plurality of normalized unweighted user scores,
      wherein the one or more processors, when generating the plurality of weighted user scores, are to:
         generate, based on the plurality of normalized unweighted user scores and the respective weight assigned to each of the plurality of users, the plurality of weighted user scores for the one or more POIs associated with the stop cluster.

5. The device of claim 1, wherein the one or more processors are further to:
   determine a first quantity of stops of the plurality of users at a particular POI, of the one or more POIS, and one or more other POIs of a same type as the particular POI;
   determine a second quantity of stops of each user, of the plurality of users, at the particular POI and the one or more other POIs of the same type as the particular POI;
   determine, based on the first quantity of stops and the second quantity of stops, the respective weight for each user of the plurality of users; and
   assign the respective weight to each user of the plurality of users to a respect.

6. The device of claim 1, wherein the POI score for the one or more POIs associated with the stop cluster is generated for a first time.

7. The device of claim 1, wherein the one or more processors, when generating the POI score, are to:
   update, based on the plurality of weighted user scores for the POI, a previously generated POI score for the one or more POIs associated with the stop cluster.

8. The device of claim 1, wherein the stop cluster includes information associated with a particular POI different from the one or more POIs.

9. The device of claim 1, wherein the stop cluster includes information associated with a plurality of POIs different from the one or more POIs.

10. The device of claim 1, wherein the one or more processors are further to:
    select the stop cluster; and
    identify at least one POI, of the one or more POIs, associated with the stop cluster for generating the POI score.

11. The device of claim 1, wherein the stop cluster is associated with a plurality of POIs, and
    wherein the generating of the plurality of unweighted user scores, the plurality of weighted user scores, and the POI score are performed for each of the one or more POIs associated with the stop cluster.

12. A non-transitory computer-readable medium storing one or more instructions, the one or more instructions comprising:

one or more instructions that, when executed by one or more processors of a device, cause the one or more processors to:
  receive location information associated with a plurality of stops by a plurality of users at one or more points of interest (POIs) associated with a stop cluster;
  generate, based on the location information, a plurality of unweighted user scores, for the one or more POIs, associated with the plurality of users;
  generate, based on the plurality of unweighted user scores and a respective weight assigned to each user of the plurality of users, a plurality of weighted user scores for the one or more POIs associated with stop cluster;
  generate, based on the plurality of weighted user scores, a POI score for the one or more POIs associated with the stop cluster; and
  provide, using the POI score for the one or more POIs associated with the stop cluster, information associated with the one or more POIs.

13. The non-transitory computer-readable medium of claim 12, wherein the one or more instructions, when executed by the one or more processors, further cause the one or more processors to:
  generate, based on receiving information identifying the one or more POIs associated with the stop cluster, the stop cluster.

14. The non-transitory computer-readable medium of claim 13, wherein the one or more instructions, that cause the one or more processors to generate the stop cluster, cause the one or more processors to:
  generate, based on receiving information identifying the one or more POIs associated with the stop cluster and according to a POI type, the stop cluster.

15. The non-transitory computer-readable medium of claim 13, wherein the one or more instructions, that cause the one or more processors to generate the stop cluster, cause the one or more processors to:
  generate, based on receiving information identifying the one or more POIs associated with the stop cluster and using one or more machine learning clustering algorithms, the stop cluster.

16. The non-transitory computer-readable medium of claim 12, wherein the stop cluster includes a geographical area in which a threshold quantity of user stops has occurred within a time period threshold, or in which a density of POIs satisfies a density threshold.

17. The non-transitory computer-readable medium of claim 16, wherein at least one of a size of geographical area, the threshold quantity of user stops, the time period, or the density threshold is based on at least one of a type of the geographical area, a POI density in the geographical area, a population in the geographical area, or a population density in the geographical area.

18. A method, comprising:
  receiving, by a device, location information associated with a plurality of stops by a plurality of users at one or more points of interest (POIs) associated with a stop cluster;
  generating, by the device and based on the location information, a plurality of unweighted user scores, for the one or more POIs, associated with the plurality of users;
  generating, by the device and based on the plurality of unweighted user scores and a respective weight assigned to each user of the plurality of users, a plurality of weighted user scores for the one or more POIs of associated with stop cluster;
  generating, by the device and based on the plurality of weighted user scores, a POI score for the one or more POIs associated with the stop cluster;
  detecting, by the device, an event associated with the other device; and
  providing, by the device and based on detecting the event, information associated with the one or more POIs using the POI score for the one or more POIs associated with the stop cluster.

19. The method of claim 18, wherein the detecting the event comprises at least one of:
  receiving a query for POI information, associated with the one or more POIs associated with the stop cluster, from the other device;
  detecting a query for navigation instructions;
  determining that the other device is within a threshold distance of the one or more POIs associated with the stop cluster; or
  determining that the other device is within a region of interest in which the one or more POIs associated with the stop cluster are located.

20. The method of claim 18, wherein the providing the information associated with the one or more POIs associated with the stop cluster comprises:
  transmitting, to the other device, the information associated with the one or more POIs associated with the stop cluster and an instruction to display the information associated with the one or more POIs associated with the stop cluster.

\* \* \* \* \*